United States Patent [19]

Saitoh

[11] 4,406,759

[45] Sep. 27, 1983

[54] METHOD AND APPARATUS FOR RESHARPENING CUTTING TOOLS BY ELECTROPOLISHING PROCESS

[75] Inventor: Joichi Saitoh, Hotarugaike-higashi, Japan

[73] Assignee: Kotobuki Seihan Printing Co., Ltd., Osaka, Japan

[21] Appl. No.: 313,179

[22] Filed: Oct. 20, 1981

Related U.S. Application Data

[62] Division of Ser. No. 206,081, Nov. 12, 1981, Pat. No. 4,331,515.

[30] Foreign Application Priority Data

Nov. 22, 1979 [JP] Japan .................................. 54-151644
Jun. 9, 1980 [JP] Japan .................................. 55-77531

[51] Int. Cl.³ ........................ C25F 3/00; C25F 3/14
[52] U.S. Cl. ........................ 204/129.55; 204/129.65; 204/129.95
[58] Field of Search ............. 204/129.55, 129.65, 204/129.9, 129.95, 129.35, 129.46

[56] References Cited

U.S. PATENT DOCUMENTS

3,762,243 10/1973 Borrkfield .................. 204/129.46 X
4,217,190 8/1980 Neal et al. ...................... 204/129.35

FOREIGN PATENT DOCUMENTS

186822 1/1967 U.S.S.R. ........................... 204/129.9

*Primary Examiner*—G. L. Kaplan
*Assistant Examiner*—Nam X. Nguyen
*Attorney, Agent, or Firm*—Armstrong, Nikaido, Marmelstein & Kubovcik

[57] ABSTRACT

A method and apparatus for resharpening cutting tools having an edge of complex curve by electropolishing process, wherein after a protective film is formed on the non-polished surface of the edge of a cutting tool, the edge is immersed in an electrolytic solution and DC voltage is applied between the tool, which serves as an anode, and a cathode plate immersed in the solution to thereby polish the edge by dissolving.

3 Claims, 11 Drawing Figures

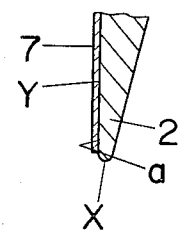
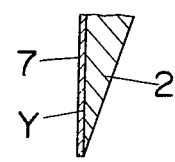
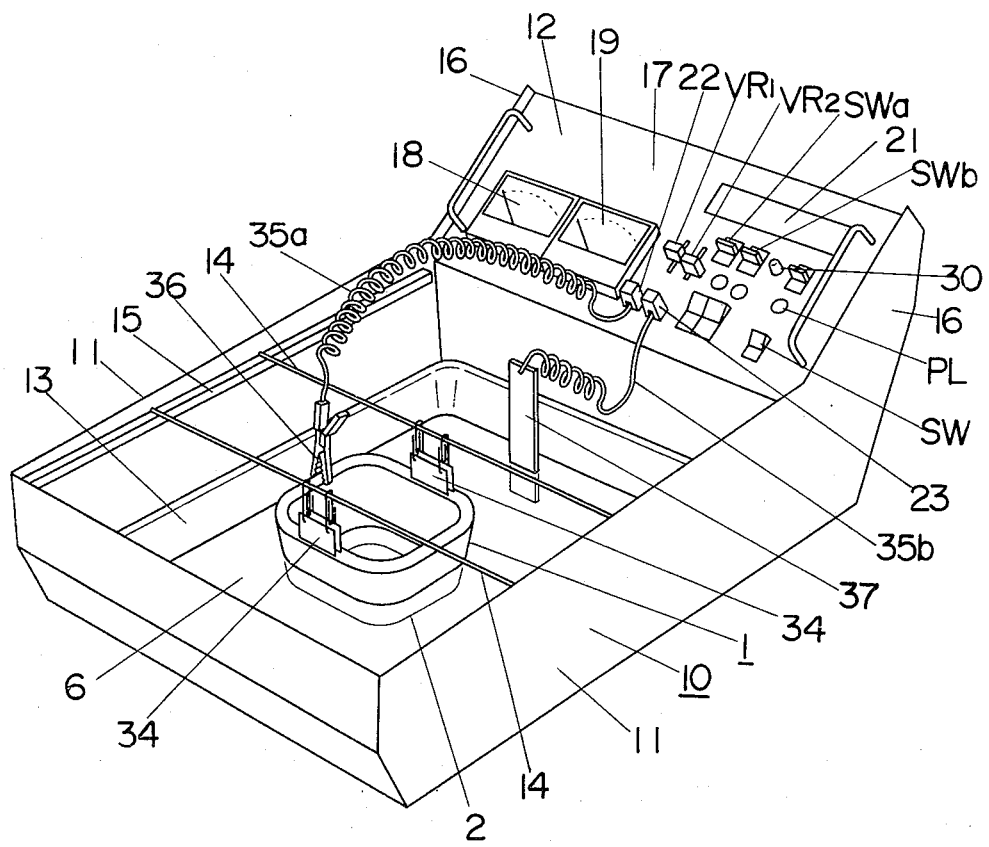

(a)

(b)

(c)

(d)

(e)

METHOD AND APPARATUS FOR RESHARPENING CUTTING TOOLS BY ELECTROPOLISHING PROCESS

This is a division of application Ser. No. 206,081, filed Nov. 12, 1981, now U.S. Pat. No. 4,331,515.

BACKGROUND OF THE INVENTION

The present invention relates to a method and apparatus for resharpening cutting tools made of metal, particularly tools having a cutting edge of complex curve, such as those used for punching out printed matter, by electropolishing process.

Conventionally, the resharpening of cutting tools has been performed manually or mechanically by using grindstones or files. With such conventional method, there may not be so much problem involved in resharpening cutting tools having a simple cutting edge, but in the case of tools used for punching out printed matter into complex shapes, the cutting edge of complex curve of the tool has numbers of concaves and convexes, making mechanical resharpening impossible and forcing the operator to resort to manual resharpening, which takes much time and labor.

Further, satisfactory resharpening requires a great deal of skill. Thus, another disadvantage is that all operators cannot always resharpen the tool satisfactorily.

SUMMARY OF THE INVENTION

With the above problems in mind, the present invention has been accomplished.

Accordingly, a first object of the invention is to provide a method whereby tools having a cutting edge, however complex, can be quickly and easily resharpened without using any grindstone of file.

A second object of the invention is to provide a method capable of putting a very sharp edge on a tool and ensuring that the required after-processing is easy.

A third object of the invention is to provide an apparatus for resharpening tools by electropolishing process, wherein tools can be readily and quickly resharpened and the apparatus is easy to handle and particularly facilitates immersion of tools in the electrolytic solution and removal of them from the latter.

A fourth object of the invention is to provide an electropolishing apparatus which is capable of easily resharpening tools having a cutting edge, however complex, and which is easy to handle.

A fifth object of the invention is to provide an electropolishing apparatus for resharpening cutting tools, wherein DC current for polishing can be automatically controlled by a timer and deterioration of the polished edge can be prevented and wherein a predetermined current value can be set according to the size of a cutting tool to be polished.

These and other objects and features of the invention will become more apparent from the following description of embodiments with reference to the accompanying drawings.

BRIEF DESCRIPTION OF THE DRAWINGS

FIGS. 3a and 3b are enlarged fragmentary sectional views of a cutting tool before and after the edge is resharpened, respectively, by the present invention;

FIG. 4 is a perspective view of another embodiment of the invention;

DESCRIPTION OF THE PREFERRED EMBODIMENTS

Figure 1:
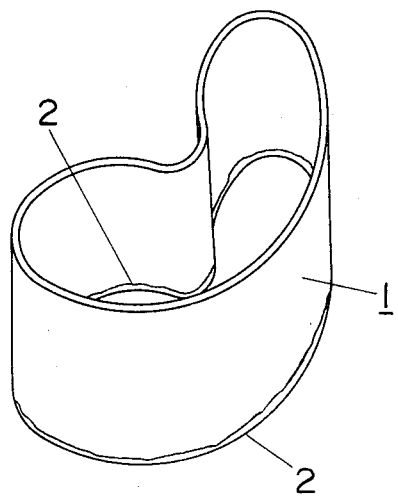
FIG. 1 is an enlarged perspective view of a cutting tool to be resharpened by the present invention.
Figure 2:
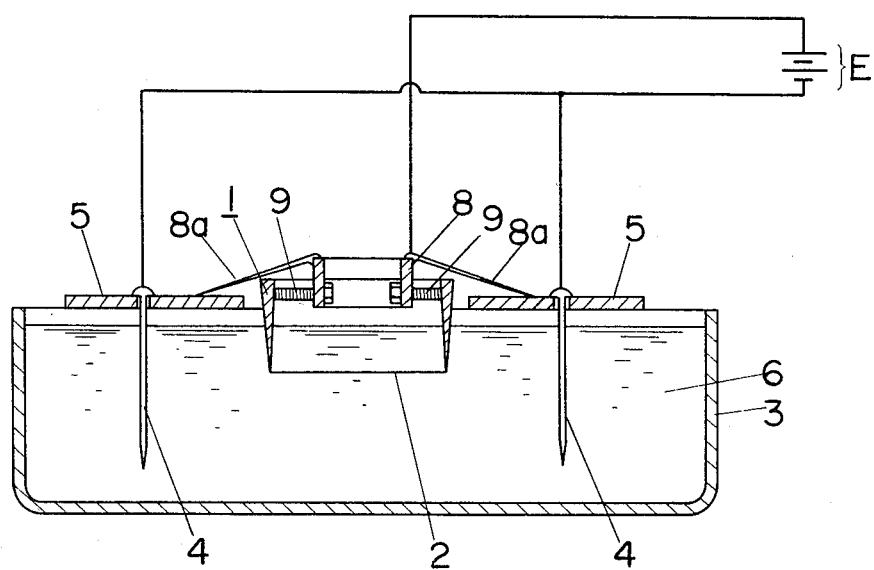
FIG. 2 is a sectional view of an electropolishing tank according to the invention.

FIG. 1 shows a cutting tool 1 of iron, which is to be resharpened according to the present invention. The tool has a cutting edge of complex curve formed by connecting numbers of concaves and convexes and is used for punching out printed labels and the like. Therefore, manual or mechanical resharpening of the edge 2 of the tool 1 takes much time and labor. FIG. 2 is a schematic sectional view of an apparatus according to an embodiment of the invention. An electrolytic solution 6 consisting, e.g., of an aqueous solution of 90% by volume of phosphoric acid and 1% by volume of sulfuric acid is stored in an electropolishing tank 3. Support plates 5 of insulating material for supporting cathode plates 4 extend over the tank and between opposite sides of the latter. Two cathodes plates 4, made of stainless steel, carbon, copper, lead or any other desired insoluble metal, are suspended from the support plates 5, with their lower portions immersed in the electrolytic solution 6, said cathode plates 4 being connected to the cathode of a DC power source E of, e.g., 10 to 15 V.

Before resharpening, as shown in FIG. 3a, the cutting edge 2 of the tool 1 is blunt. Thus, a non-polished surface protecting film 7 is formed on the non-polished side a at the back of the cutting edge 2 while leaving the blunt area X exposed, as shown in FIG. 3a. Subsequently, the tool 1 is supported by a support jig 8 at four places with bolts 9 so that the cutting edge 2 is directed downward as shown in FIG. 3b. The legs 8a of the support jig 8 are then placed on the support plates 5 disposed on opposite sides of the electropolishing tank 3, with the cutting edge 2 of the tool 1 immersed in the electrolytic solution 6.

Subsequently, the anode of the DC power source E is connected to the tool 1 and the cathode to the cathode plate 4, so that electric current flows between the cutter 1, which is the anode, and the cathode plates 4.

Thus, the cutting tool 1 made of iron is subjected to electropolishing for 30 to 90 minutes, the solution temperature being 30° C., the DC power source voltage being 10 to 15 V, and the current density being 0.1 A/cm$^2$. As a result, the surface unevenness, including nicks, of the cutting edge 2 on the areas other than that covered with the protective film 7 is removed, and a sharp edge 2 appears.

The protective film 7 is produced by mixing liquid vinyl acetate, varnish, and a mixture of 40% by volume of phthalic acid and 60% by volume of cellulose acetate, in equal amounts or 30% by volume each, adding 10% by volume of toluene as a solvent to the resulting mixture to provide a mixed synthetic liquid, applying the latter to the non-polished surface a of the cutting edge 2 of the tool 1 prior to polishing or resharpening, and allowing the same to stand at ordinary temperature for about 10 minutes for natural drying. The film will not peel off the edge or droop, thus ensuring attainment of a sharp polished edge. Upon completion of the resharpening treatment, the film can be easily removed by hand without using mechanical means or a solvent.

Figure 5:
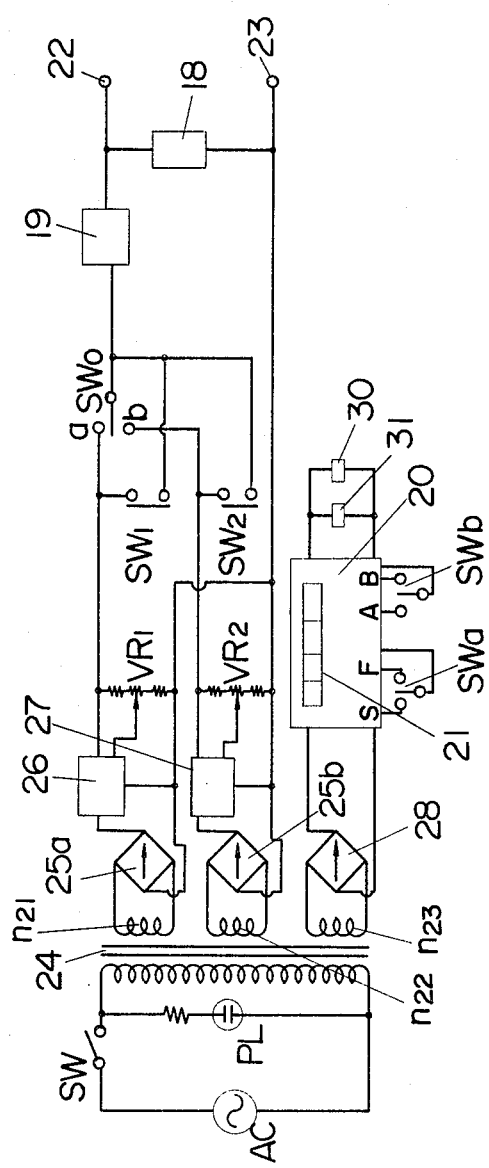
FIG. 5 is an electric circuit diagram of the apparatus shown in FIG. 4.

FIG. 4 shows another embodiment of an apparatus according to the invention, and FIG. 5 shows electric circuitry incorporated in the apparatus shown in FIG. 4. A box body 10 made of metal and top-opened, is sized to be placeable on a desk and removably receives a tray made of synthetic resin through the top opening. The box body 10 is provided with an operating section 12 in the front. Support bars 15 of insulating material carry the opposite ends of support rods 14 which suspend the cutting tool 1 to be resharpened, said support bars being attached to and extending longitudinally of the upper inner regions of opposite sides 11 of the box body 10. The operating section 12 is installed between extensions 16 which extend obliquely upward from the front ends of the sides 11, and houses circuit components including a power transformer 16. Attached to the front panel 17 of the operating section 12 are a voltmeter 18, an ammeter 19, operating switches SWa and SWb, a time indicator 21 for a timer 20, an anode terminal 22 and a cathode terminal 23. The power transformer 24 includes a secondary winding n21 for large current, a secondary winding n22 for minute current, and a secondary winding n23 for feeding the timer 20, said secondary winding n21 for large current being adapted to provide a secondary output of about 20 V, which is then rectified by a rectifying bridge 25a to provide a DC output of about 10 to 15 V to a constant-voltage circuit 26 whose setting is variable. On the other hand, the secondary winding n22 for minute current produces a secondary output of several volts, which is then rectified by a rectifying bridge 25b to provide a DC output of several volts to a constant-voltage circuit 27 whose setting is variable. The timer 20 is an electronic timer composed of LSI's and is adapted to operate by using as its power source a DC current obtained by rectifying the secondary output from the secondary winding n23 by means of a rectifying bridge 28. The timer performs timing operation by counting, as clock pulses, e.g., the commercial frequency of a commercial power source AC. When an operating time is set by the time setting switch SWa and the start-reset switch SWb is set to its start position A, the timer will perform timing operation by turning on a time switch SW1 and turning off a time switch SW2. Thus, when the time is up, it will turn off the time switch SW1 and turn on the time switch SW2, such state being maintained until the start-reset switch SWb is shifted to the reset position B. The operating time and the amount of elapse of time are digitally indicated by the time indicator 21, while in order to report the expiration of the timing period, an indicator lamp 30 is lighted and a warning buzzer 31 is sounded. The time switches SW1 and SW2 have one of their respective ends connected to the anode terminal 22 through the ammeter 19, the other end of said time switch SW1 being connected to the plus output terminal of the constant-voltage circuit 26 and the other end of said time switch SW2 being connected to the plus output terminal of the constant-voltage circuit 27, so that the output of that constant-voltage circuit which is now not connected to the anode terminal 22 will be connected thereto when the time is up. The minus output terminals of the constant-voltage circuits 26 and 27 are connected together and then to the cathode terminal 23, while their plus output terminals are respectively connected to the terminals a and b of a manual operating switch SWo, so that such plus output terminal can be connected to the anode terminal 22 also by switching the manual operating switch SWo. The ammeter 18 is connected between the terminals 22 and 23.

Figure 6:
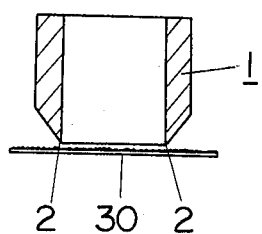
FIGS. 6a through 6e illustrate a resharpening process at successive stages, using the apparatus shown in FIG. 4.
Figure 6:
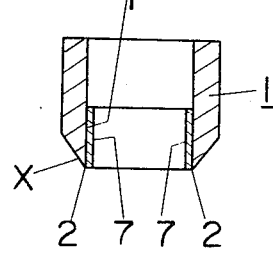
Figure 6:
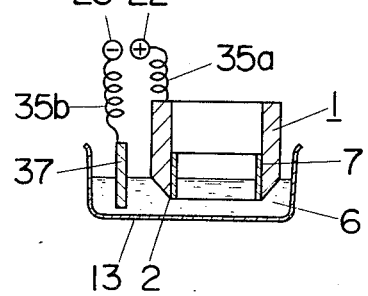
Figure 6:
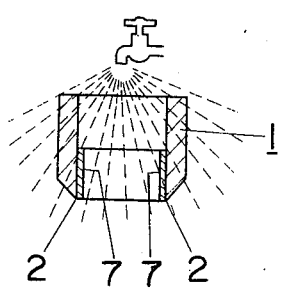
Figure 6:
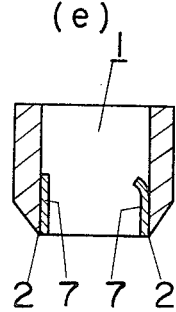

The way of using tool resharpening electropolishing apparatus will now be described with reference to FIG. 6.

First, an electrolytic solution 6 in the form of an aqueous solution, e.g., of 90% by volume of phosphoric acid and 1% by volume of sulfuric acid is stored in an electropolishing tank 13. Next, the cutting edge 2 of a tool to be resharpened which is made of iron or alloys thereof (including stainless steels), aluminum or alloys thereof, copper or alloys thereof, nickel or alloys, thereof, or any other electropolishable metal is polished with sandpaper 30 to smooth the edge 2, as shown in FIG. 6a. A non-polished surface protecting film 7 is formed on the non-polished surface Y at the back of the edge 2 while leaving the blunt region X of the edge 2 exposed, as shown in FIG. 6b. The protective film 7 is made of a mixed resin liquid prepared by mixing vinyl acetate, varnish, and a mixture of 60% by volume of phthalic acid and 40% by volume of cellulose acetate, in equal amounts or 30% by volume each, and adding 10% by volume of toluene as a solvent to the resulting mixture, the latter being applied to the back of the edge and allowed to stand for drying. Two parallel rods 14 support suspenders 34, by which the upper portion of the tool 1 is held to hang therefrom. The support rods 14 are placed on support bars 15 to extend between the latter. Thus, the tool 1 is suspended from the suspenders 34 in the electropolishing tank 13, with the edge 2 of the tool 1 at the lower end thereof being immersed in the electrolytic solution 6. The tool 1 is gripped by a clip 36 which is connected to the anode terminal 22 through a curled coil 35a, whereby the tool 1 is connected to the anode terminal 22. A cathode plate 37 made of stainless steel, carbon, copper, lead or any other insoluble metal and connected to the cathode terminal 23 through a curled coil 35b is immersed in the electrolytic solution 6 (FIG. 6c). Then, it must be decided whether the operation should be performed manually or by using the timer 20. If it is desired to perform the operation by using the timer 20, the operator sets the manual operating switch SWo at the neutral and moves the time setting switch SWa from its neutral position either to the slow position S or to the fast position F to indicate an operating time in which the electropolishing is to be completed (within 30 to 90 minutes), and then the operator moves said switch back to its neutral position, whereby the operating time is set and a zero time is indicated on the time indicator 21. The operator then moves the reset-start switch SWb from its neutral position to the start position A. Simultaneously with this operation, the timer 20 starts operation, closing the time switch SW1 while leaving the now-opened timer switch SW2 as it is. Therefore, the voltage from the constant-voltage circuit 26 is applied between the anode terminal 22 and the cathode terminal 23. This voltage can be set by a variable slide resistor VR1, and the setting is such that the voltage is in the range of 10 to 15 V, at which the proper current in the range of about 0.1 to 1 A/cm$^2$ flows. The voltage and current values are indicated by the voltmeter 18 and ammeter 19, respectively. Thus, said current flows at ordinary temperature (e.g., 30° C.), so that the portion of the edge 2 not covered with the protective film 7 dissolves out as metal ions to remove the surface unevenness including nicks, thereby presenting a sharp edge 2. At the expiration of the timing period, the timer 20 actuates the indicator lamp 30 and warning buzzer 31 to report the completion of resharpening. Simultaneously with said expiration, the time switch SW1 is opened and the time switch SW2 is closed. Therefore, the voltage to be applied between the anode terminal 22 and the cathode terminal 23 is the output from the constant-voltage circuit 27, the output current being tens of milliamperes. This value is preset at the proper value by a variable slide resistor VR2 in the constant-voltage circuit 27, and is effective to maintain electropolishing at such a strength as to prevent the edge 2 of the tool 1 from being attacked and deteriorated by the electrolytic solution 6. When the reset-start switch SWb of the timer 20 is moved to the reset position S upon completion of polishing, the time switches SW1 and SW2 are both opened and the timing period is reset. After resetting, too, the time indicator 21, of course, renewedly indicates the present time. The tool 1, which has thus undergone resharpening, is washed with water, as shown in FIG. 6d, and the protective film 7 is then manually removed to complete resharpening.

In addition, if the manual operating switch SWo is set to the terminal a, a high voltage for electropolishing can be applied between the anode terminal 22 and the cathode terminal 23, while if it is set to the terminal b, a minute voltage for prevention of deterioration can be applied between the anode terminal 22 and the cathode terminal 23. Shown at SW is a power source switch and at PL is a power source lamp. In FIG. 4, the tool 1 has been shown as suspended by the support rods 14 bridging the space between the support bars 15 on opposed inner lateral surfaces of the body 10, but support plates 5 may be used, as in FIG. 2.

As has been described so far, according to the present invention, after a protective film is formed on the non-polished surface of the edge of a tool, the edge is immersed in an electrolytic solution and, with the tool used as the anode, DC voltage is applied between it and the cathode immersed in the electrolytic solution, for a predetermined time, so as to resharpen the edge by dissolving the same. Thus, even recessed narrow areas can be easily and positively polished and the rate of processing is 2-3 times as high as in the case of mechanical polishing devices, such as files, and better finishes can be achieved. The protective film is formed by mixing vinyl acetate, varnish, and a mixture of 60% by volume of phthalic acid and 40% by volume of cellulose acetate, in equal amounts or 30% by volume each, to prepare a solution, applying said solution to the tool and drying the same. Thus, the protective film, unlike paint or adhesive agents, is free from drooping particularly at the cutting edge, thus providing a sharp finish on the cutting edge. Further, upon completion of resharpening, the film can be manually removed without need to use mechanical means, so that the after-treatment step is shortened. Further, since the electrolytic solution receptacle is removably received in the box body, washing of the electrolytic solution receptacle can be carried out separately from the box body, facilitating handling. Further, the provision of support rods removably installed to bridge the space between opposed lateral sides of the box body for suspending a tool to be resharpened from the upper region of the electrolytic solution receptacle makes it only necessary to suspend the tool in advance from the support rods and place the latter in position when the tool is to be immersed in the electrolytic solution. Further, when it is desired to withdraw the tool, the support rods together with the tool may be removed from the box body. Thus, tool mounting and demounting operation is easy. The provision of the DC power source for passing DC current between the tool having its edge immersed in the electrolytic solution and the cathode plate and of the operating section integral with the box body saves need of wiring the apparatus from a separate power source, makes the apparatus compact and facilitates transport and installation of the apparatus.

What is claimed is:

1. A method of resharpening cutting tools by electropolishing process, comprising the steps of forming a protective film on a non-polished surface of an edge of the tool, immersing said edge in an electrolytic solution, applying a DC voltage between said tool serving as an anode and a cathode, which is immersed in said electrolytic solution, for a predetermined time to thereby polish said edge by dissolving and removing said protective film.

2. A method as set forth in claim 1, wherein said protective film is formed by mixing vinyl acetate, varnish, and a mixture of 60% by volume of phthalic acid and 40% by volume of cellulose acetate, in equal amounts, to prepare a solution, applying said solution to the tool and drying the same.

3. A method as set forth in claim 1, wherein said electrolytic solution is an aqueous solution of 90% by volume of phosphoric acid and 1% by volume of sulfuric acid.

* * * * *